313-293

Examiner

July 28, 1936.

O. T. McILVAINE

THERMIONIC TUBE

Original Filed May 6, 1925

Re. 20,048

Orig. 1,853,914

O.T.McIlvaine
Inventor

By Scutt and Freeman
Attorneys

250. RADIANT ENERGY

Examiner

Reissued July 28, 1936

Re. 20,048

UNITED STATES PATENT OFFICE 20,048

THERMIONIC TUBE

Oran T. McIlvaine, St. Charles, Ill., assignor to McIlvaine Patent Corporation, St. Charles, Ill., a corporation of Delaware Original No. 1,853,914, dated April 12, 1932, Serial No. 28,401, May 6, 1925. Application for reissue September 14, 1934, Serial No. 743,990

9 Claims. (Cl. 250—27.5)

Figure 1:
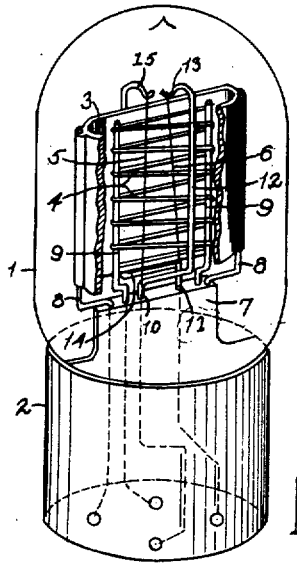

This invention relates to thermionic tubes such as are employed in the reception, detection and amplification of radio messages and also in telephone repeating and amplification, and other instances of amplification and magnification of electrical impulses.

The customary mode of generating negative electrons is to use a metallic filament heated electrically, and it has always heretofore been necessary to employ an absolutely steady direct current for this purpose since any variation in the current caused similar variations in the reception wires. Thus the employment of alternating current produced a hum which obliterated all signals, and the customary mode heretofore followed has been to energize the emitting filament by the use of a primary or storage battery.

The object of the present invention is the provision of a tube of this character which can be connected directly to an alternating current supply of the requisite voltage and which will exhibit the same mode of operation as with a direct current source, entirely without humming sounds or other noises; the provision of a new arrangement of filaments whereby variations in direction and potential of the current flow may be neutralized; while other objects and advantages of the invention will become apparent as the description proceeds.

In the drawing accompanying and forming a part of this application I have shown specimen modes of applying my invention to a standard tube of one of the most widely known makes although it will be understood that I do not limit myself to kind, appearance, or type of tube and have chosen this solely for purposes of illustrating the essential idea of my invention without restricting myself to the arrangement shown.

Figure 2:
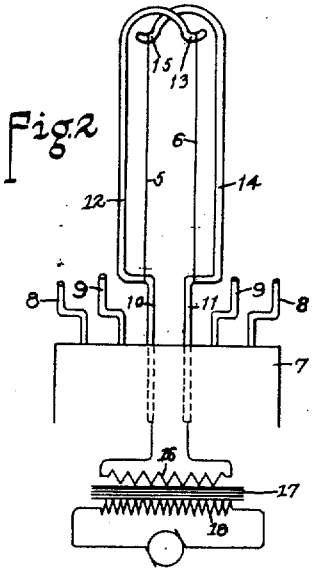
Figure 3:
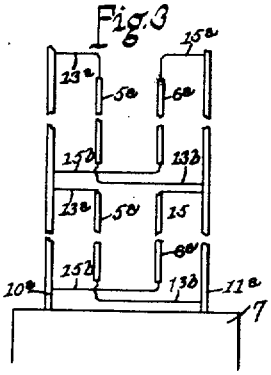
Figure 4:
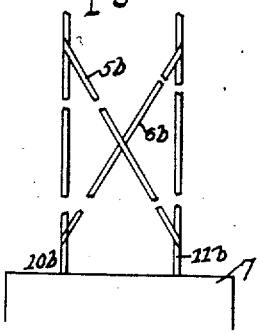
Figure 5:
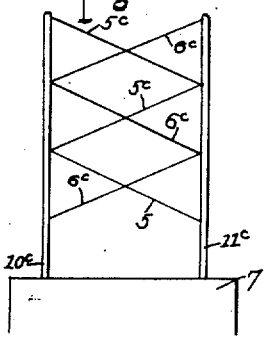
Figure 6:
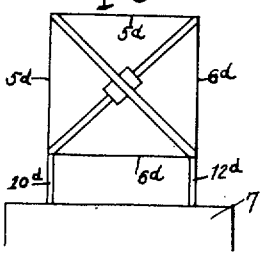
Figure 7:
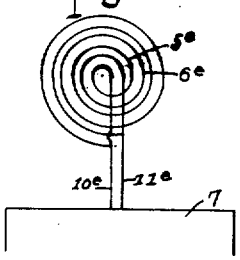

Referring now to the drawing, Fig. 1 is a perspective view of a tube of the type described, portions of the elements being broken away in order to show the internal construction; Fig. 2 is an enlarged view of the filament and support, the plate and grid being entirely omitted; Figs. 3, 4, and 5 are detail views showing other arrangements of filaments; and Figs. 6 and 7 are detail views showing concentrated forms of filaments as desired for certain other types of tubes.

Practically all tubes comprise an evacuated glass globe 1, a supporting base 2, and certain metallic elements enclosed within the tube and comprising in one guise or another, a plate 3, grid 4 and filaments 5 and 6. Ordinarily the filaments consist of a single circuit but according to my invention I make said filaments of even numbers of plural strands located closely together and connected between the terminals of the alternating current in reversed positions, the filaments being so arranged as regards other elements that the electrostatic condition created by one filament shall be neutralized by the other filament, with the result of producing a steady source of negative electrons.

Thus, in the form shown in Figs. 1 and 2 the various wires are brought into the tube through a press 7 in which numerous wires are sealed such as the wires 8, which carry the plate, the wires 9, which carry the grid and the connections 10, 11, which carry the filaments. The connection 10, in addition to receiving the lower end of the filament 5 also carries a bracket 12 terminating at its upper end in a hook 13 which supports the upper end of the companion filament 6. Likewise the connection 11 carries a bracket 14 which terminates at its upper end in a hook 15 to which is secured the upper end of the filament 5. Preferably in practice these brackets 12 and 14 are located outside of the tube elements as shown in Fig. 1 and the reversal of the connections of the corresponding ends of the adjacent filaments provides a non-inductive circuit through such filaments.

The filament and elements are connected to base contacts in the usual manner and in use the wires 10, 11 are connected to opposite ends of the secondary winding 16 of a transformer 17 whose primary winding 18 is connected to any suitable supply of alternating current such as the ordinary lighting circuit. Any suitable or desired voltage may be employed although I have been particularly successful with the use of a rather large current and small voltage, the latter about ½ to 1 volt. This has the further advantage of enabling the use of heavier and stronger filament wires than can be used in higher voltages.

If we assume at any given instant that the wire 10 is positive and the wire 11 negative, due to the fluctuations in the circuit, then the lower end of the filament 5 will be positive and the lower end of the filament 6 negative and at the same time, owing to the fact that the brackets 12 and 14 have substantially a zero resistance the upper end of the filament 6 is positive.

In other words the A. C. wave starts simultaneously at opposite ends of the two filaments, and as the wave progresses, it progresses exactly the same in both filaments, that point which was before highly positive gradually decreasing and that point which before was highly negative gradually approaching positive until the two reach the same condition, which occurs midway of the wave, after which the lower end of the filament 5 becomes increasingly negative and the lower end of the filament 6 increasingly positive. Considered in another aspect it can be pictured that alternating waves are constantly chasing each other up and down the respective filaments but are so related, one to the other, that the algebraic sum of such waves at equal horizontal levels in the respective filaments is always zero.

This is readily seen at the instant of highest potential in one of the filaments, at which time the corresponding point in the other filament exhibits its correspondingly low potential, and if these filaments are sufficiently close together the electrostatic charge on the one exactly equals that on the other; and is likewise true when as a result of the advance of a wave a given point of one filament becomes zero relative to outside standards at which instant the corresponding point of the other filament should always exhibit zero potential. As a result both wires are always maintained under sufficient temperature to produce an adequate supply of electrons, without at the same time causing the alternating current of the lighting systems to influence the reception since a positive condition at each point of each filament is exactly counterbalanced by an equivalent negative on the nearest segment of the companion filament.

These filaments may be supported and looped in a great many modes without departure from the scope of my invention or avoiding this mode of operation. The arrangement illustrated in Figs 1 and 2 is in many ways the simplest and most practical. However, it is equally possible whenever desired to increase the number of filaments as for example by making them in small segments as shown in Fig. 3 in which case the wires $10^a$ and $11^a$ are provided with brackets $13^a$, $13^b$, $15^a$, $15^b$ respectively adapted to support the segments $5^a$, and $6^a$; the lower ends of the segments being suitably connected to the other wires to which their respective upper ends were attached.

Another mode of arrangement is shown in Fig. 4 wherein the filaments $5^b$ and $6^b$ are connected at their upper and bottom ends to the wires $10^b$ and $11^b$, these filaments being made of any suitable material. In the form of the invention shown in Figs. 1 and 2 I have shown tungsten wires. These may, if desired, have their emissivity increased by a coating of refractory earths such as thoria, and the greater thickness of the filaments as in Fig. 3 is intended to indicate this. In Fig. 4 I have shown these filaments as consisting of thin strips or ribbons of nickel, which also may, if desired, be treated superficially to increase the emissivity. In this case it is not necessary to keep the filaments apart at the center since this point always exhibits equal potential on the two filaments.

In the form shown in Fig. 5 the filaments instead of making only one connection between the wires $10^c$ and $11^c$ are looped back and forth repeatedly. The forms shown in Figs. 6 and 7 are devised for a more concentrated arrangement. In Fig. 6 the supporting wires $10^d$ and $12^d$ are crossed but insulated from each other at the center, their extremities being surrounded by filaments $5^d$ $6^d$ here making a complete parallelogram; and in Fig. 7 the filaments $5^e$, $6^e$ are shown as wound together into a double spiral, the ends being connected to the terminals $10^e$, $11^e$.

It is not important whether the filaments 5 and 6 be parallel to each other as they appear to be in Fig. 2 or somewhat inclined as in Figs. 1, 4, and 5, provided only that they be substantially parallel to the face of the anode and that they be symmetrical with respect to a straight line which is parallel to the face of said anode. This axis of symmetry may either be vertical as in the form of Fig. 1 or transverse as in Fig. 5. Indeed in Figs. 4, 5, and 6 there are two rectangular axes of symmetry.

I have described the condition I have sought and here obtained by the expression that the electrostatic effect produced by one filament is neutralized by another filament, or that the combined, external, electrostatic effect of those filaments is zero. This concept possibly requires additional elucidation. It is the purpose of my invention to obtain thermal emission of negative electrons by the use of an alternating current. It has been known for many years that electrons are driven off a metallic body by heating it. If the body be insulated from other bodies the number of electrons that can be removed is comparatively small since the abstraction of each negative charge leaves a corresponding positive charge on the body which tends to pull the charges back.

In case the accumulated positive charge thus developed on the heated body be neutralized or discharged in any way more electrons are freed. This can be done by attaching the body to the negative pole of a high potential battery such as the "B battery" used in radio work, especially it the other pole of the same battery be brought sufficiently near to receive the negative electrons so emitted.

When an electric current is used to heat the body a second set of electrons is employed at the same time, the hypothesis being that this current is merely the passage of a different set of electrons through the body, and the heating effect a symptom of resistance to the passage of those electrons. Although the two currents traverse the same body, namely the current which causes the heat and the current which causes the electronic emission, they are entirely separate and distinct and independent.

It is hardly believed that the individual electrons which enter with the heating current always escape with that current and vice versa any more than the individual drops of water that enter a reservoir through two pipes leave that reservoir through any given pipes. Presumably the electrons are devoid of individuality so that it is merely requisite that the same number per second leave the body over the respective circuits as entered it by those circuits, but as long as the heating circuit is uniform in potential its electrostatic effect can be ignored.

Now if the potential of either circuit be varied, the rate of electronic emission must likewise vary. If the B battery be removed or made more feeble the number of electrons which can be released is likewise reduced; and if the body be heated by an alternating current its potential constantly in accordance with the phase of the E. M. F. will vary and ordinarily tends to influence the electron emission in like proportion. It is for the purpose of neutralizing this effect that I employ plural bodies (in this case the filaments 5, 6,) so arranged that when a given point of one shall be positive the corresponding point of the other shall be negative. This is expressed briefly by the statement that the combined electrostatic effect of the two bodies (filaments) is zero.

It appears not to be necessary that the two bodies be so close together at every point as to effect such neutralization at every point; indeed it is arguable that this condition might cause the one which chanced momentarily to be positive to absorb all the electrons emitted at that instant by the other body. It is only necessary that their combined electrostatic effect upon adjacent bodies or elements as a whole should be neutralized, leaving the heating effect free to release the electrons in the same manner as in the case of any other mode of heating.

The fact that the result in view can be obtained by any one of the various arrangements of filaments shown herein indicates that it is the total summation effect which is important and not the detailed effect at given points. This fact further indicates that numerous other detailed arrangements of filaments and elements can be employed with successful results, wherefore I do not restrict myself to the arrangements, or designs, or connections herein shown, nor in any other manner except as recited in my several claims.

Having thus described my invention what I claim is:

1. A cathode structure comprising, a plurality of parallel non-contiguous filaments, and a pair of current supplying supporting members connected to the opposite terminals of said filaments adapted to conduct electrical energy from an outside source to the said filaments, the adjacent terminals of the said filaments being reversely connected to said current supplying supporting members.

2. A thermionic tube comprising, a hollow envelope, plate and grid elements and an even number of incandescible filaments therein, each of said filaments having a part lying substantially alongside of a neighboring filament, a pair of terminal members sealed in said envelope adapted for connection to a source of alternating current, and conductors reversely connecting the corresponding ends of said filaments to said terminal members whereby the instantaneous direction of current flow in the neighboring parts of the filaments is substantially opposite.

3. A thermionic tube comprising, a hollow envelope, an anode and a cathode structure therein, said cathode structure including a plurality of resistance wires with a portion of each of such resistance wires adjacent to but out of contact with a corresponding portion of another of such resistance wires, and a pair of terminal members sealed in said envelope and reversely connected to adjacent ends of the resistance wires of said cathode structure whereby the potential difference of such ends is substantially equal to the potential difference of the opposite ends of the same wires at any instant when the wires are connected in circuit with an ordinary alternating current supply system.

4. A thermionic tube having therein a plate, a grid, and a cathode comprising a pair of parallel arranged filaments defining a filamentary structure with adjacent non-contiguous portions, and a pair of terminals reversely connected to each of the two corresponding ends of the filaments of said filamentary structure whereby such ends are maintained at corresponding differences of potential when said terminals are connected in circuit with the ordinary alternating current lighting system.

5. A thermionic tube comprising, a plurality of incandescible filaments mounted one alongside the other in closely spaced relation, a grid element extending about said filaments, a plate element extending about said grid element, and terminal members alongside said plate element at the side remote from said grid element and reversely connected to the opposite ends of said filaments whereby the adjacent ends of such filaments exhibit similar differences of potential when said terminal members are connected to an external source of alternating current supply.

6. A thermionic tube comprising, a pair of incandescible filaments mounted one alongside the other in closely spaced relation, a grid element surrounding said filaments, a plate element surrounding said grid element, and a pair of terminal members, one having a part connected to an end of one of said filaments and another part connected to the opposite end of the other of said filaments, the other of said terminal members having corresponding parts connected in like manner to the other ends of said filaments.

7. A thermionic tube comprising, a pair of closely adjacent parallel filaments, each portion of one of said filaments being adjacent to but out of contact with a corresponding portion of the other of said filaments, a grid element surrounding said filaments, a plate element surrounding said grid element, and a pair of terminal members, one having a part connected to an end of one of said filaments and another part connected to the opposite end of the other of said filaments, the other of said terminal members having corresponding parts connected in like manner to the other ends of said filaments.

8. An alternating current operated thermionic tube including a cathode comprising a heater having a pair of adjacent filaments and a pair of terminal members therefor adapted for connection to a source of alternating current, the filaments each having a part lying substantially alongside a neighboring filament, the adjacent ends of said filaments being connected to opposite terminal members whereby the direction of current flow in said filaments is opposite and the inductive effect of the current flowing in one filament is substantially neutralized by the inductive effect of the oppositely flowing current in the other filament.

9. An alternating current operated thermionic tube having therein a plate, a grid and a cathode; said cathode comprising a filamentary structure having a plurality of resistance wires, each wire having a part lying alongside a neighboring wire, and a pair of terminal members separately connected to the two pairs of adjacent ends of said wires whereby the instantaneous direction of flow in the neighboring parts of the wires is substantially opposite when the terminal connections are connected to a source of alternating current supply.

ORAN T. McILVAINE.